(12) United States Patent
Grube et al.

(10) Patent No.: US 9,511,566 B2
(45) Date of Patent: Dec. 6, 2016

(54) BUILDING CONSTRUCTION MATERIAL WITH HIGH SOLAR REFLECTIVITY

(75) Inventors: Louis Lynn Grube, Bound Brook, NJ (US); Natalino Zanchetta, Boca Raton, FL (US); Steve James Ceresola, Fallon, NV (US); Kirk Douglas Mulder, Fernley, NV (US)

(73) Assignee: Polyglass USA, Inc., Fernley, NV (US)

( * ) Notice: Subject to any disclaimer, the term of this patent is extended or adjusted under 35 U.S.C. 154(b) by 262 days.

(21) Appl. No.: 13/464,521

(22) Filed: May 4, 2012

(65) Prior Publication Data

US 2012/0288678 A1    Nov. 15, 2012

Related U.S. Application Data

(60) Provisional application No. 61/458,977, filed on May 13, 2011, provisional application No. 61/486,508, filed on May 16, 2011.

(51) Int. Cl.
*B32B 11/10* (2006.01)
*E04D 5/12* (2006.01)
(Continued)

(52) U.S. Cl.
CPC ............. *B32B 11/10* (2013.01); *C09D 5/004* (2013.01); *C09D 5/028* (2013.01); *C09D 7/1283* (2013.01);
(Continued)

(58) Field of Classification Search
CPC ....... B32B 11/00; B32B 11/02; B32B 33/00; B32B 37/153; B32B 2395/00; B32B 2419/06; B32B 2307/416; E04D 5/12; E04D 5/10; E04D 5/02; C04B 26/02; C04B 14/024; C04B 14/28; C04B 14/30; C04B 14/303; C04B 14/304; C04B 24/00; C04B 2111/00482; C04B 2103/408; C04B 2103/44; C04B 2103/50; C04B 2103/54; C04B 2103/63; C04B 2103/67; D06N 5/00; Y10T 428/2438; Y10T 428/24372; Y10T 428/24388; Y10T 428/24421; Y10T 428/2443; Y10T 428/24413
USPC .......................... 428/141–150, 220; 427/203
See application file for complete search history.

(56) References Cited

U.S. PATENT DOCUMENTS 1,913,667 A    6/1933   Harshberger
2,133,988 A   10/1938   Harshberger
(Continued)

OTHER PUBLICATIONS

Author Unknown: Archived Date: Aug. 26, 2006. New Jersey Institute of Technology. Paint Pollution, Section 2. Paints, Published online at mjcmr.njit.edu/distils/lab/paint_html/paint1.htm.*
(Continued)

*Primary Examiner* — Nathan Van Sell
(74) *Attorney, Agent, or Firm* — Greenberg Traurig, LLP

(57) ABSTRACT

A coating composition for granular roofing has a liquid phase, such as a water, vinyl copolymer or a modified acrylic, and a material with high reflectance, such as $CaCO_3$, $TiO_2$, ceramic microspheres, nano-particles, talc dispersed therein to yield a low-viscosity coating. The coating is applied to a granular surface in a thin layer that does not significantly disturb the granular aesthetics, but covers the base material, e.g., modified bitumen, at least partially, to increase the overall reflectivity of the material. In some embodiments, the coating improves the physical integrity of the granular surface and increases resistance to environmental effects and may perform a pigment function. In one embodiment, the coating is applied as a powder followed by the application of a liquid. In another embodiment, the coating includes a water repellant.

27 Claims, 3 Drawing Sheets

(51) Int. Cl.
*C09D 5/00* (2006.01)
*C09D 5/14* (2006.01)
*C09D 5/33* (2006.01)
*C09D 5/02* (2006.01)
*C09D 7/12* (2006.01)

(52) U.S. Cl.
CPC .......... *E04D 5/12* (2013.01); *B32B 2250/03* (2013.01); *B32B 2250/40* (2013.01); *B32B 2262/0276* (2013.01); *B32B 2262/101* (2013.01); *B32B 2264/102* (2013.01); *B32B 2264/104* (2013.01); *B32B 2264/12* (2013.01); *B32B 2307/416* (2013.01); *B32B 2307/7145* (2013.01); *B32B 2307/73* (2013.01); *B32B 2419/06* (2013.01); *Y10T 428/2438* (2015.01); *Y10T 428/2443* (2015.01); *Y10T 428/24372* (2015.01); *Y10T 428/24388* (2015.01); *Y10T 428/24413* (2015.01); *Y10T 428/24421* (2015.01)

(56) References Cited

U.S. PATENT DOCUMENTS

| | | | |
|---|---|---|---|
| 2,332,219 A | 10/1943 | Harshberger | |
| 2,379,358 A | 6/1945 | Jewett | |
| 3,255,031 A | 6/1966 | Lodge et al. | |
| 3,384,586 A * | 5/1968 | McMillen | 508/154 |
| 3,479,201 A | 11/1969 | Sloan | |
| 3,528,842 A | 9/1970 | Skadulis | |
| 3,705,838 A | 12/1972 | Olton et al. | |
| 3,856,545 A | 12/1974 | Ferrigno | |
| 4,120,132 A | 10/1978 | Kendrick | |
| 4,288,959 A | 9/1981 | Murdock | |
| 4,439,344 A * | 3/1984 | Albanese | 516/69 |
| 4,478,869 A | 10/1984 | Brady et al. | |
| 4,617,198 A | 10/1986 | Overturf | |
| 4,711,914 A | 12/1987 | Rei et al. | |
| 5,088,259 A | 2/1992 | Myers | |
| 5,234,987 A | 8/1993 | Hubbard et al. | |
| 5,380,552 A | 1/1995 | George et al. | |
| 5,474,838 A | 12/1995 | Callaway et al. | |
| 5,540,971 A | 7/1996 | Daurer et al. | |
| 5,573,810 A | 11/1996 | Grubka | |
| 5,662,733 A | 9/1997 | Hudson et al. | |
| 5,695,373 A | 12/1997 | Blackmore et al. | |
| 5,813,176 A | 9/1998 | Tzeng et al. | |
| 5,869,166 A * | 2/1999 | Caldwell | C08K 3/0008 106/801 |
| 5,922,121 A | 7/1999 | Kwan | |
| 5,965,626 A | 10/1999 | Tzeng et al. | |
| 6,110,846 A | 8/2000 | Bzozowski et al. | |
| 6,134,856 A | 10/2000 | Khan et al. | |
| 6,194,519 B1 | 2/2001 | Blalock et al. | |
| 6,207,593 B1 | 3/2001 | Fields | |
| 6,214,466 B1 | 4/2001 | Joedicke | |
| 6,235,372 B1 | 5/2001 | Joedicke | |
| 6,296,912 B1 | 10/2001 | Zickell | |
| 6,296,921 B1 | 10/2001 | Blackmore et al. | |
| 6,341,462 B2 | 1/2002 | Kiik et al. | |
| 6,360,511 B1 | 3/2002 | Bzozowski et al. | |
| 6,423,129 B1 | 7/2002 | Fitzgibbons, Jr. | |
| 6,502,360 B2 | 1/2003 | Carr et al. | |
| 6,544,596 B2 | 4/2003 | Clemens et al. | |
| 6,548,145 B2 | 4/2003 | Joedicke | |
| 6,569,527 B1 * | 5/2003 | Calhoun et al. | 428/402 |
| 6,607,781 B2 | 8/2003 | Joedicke | |
| 6,642,296 B2 | 11/2003 | Fisher | |
| 6,753,362 B2 | 6/2004 | Khan et al. | |
| 6,838,152 B2 | 1/2005 | Joedicke | |
| 6,858,315 B2 | 2/2005 | Khan et al. | |
| 6,872,440 B1 | 3/2005 | Kiik et al. | |
| 6,924,015 B2 | 8/2005 | Zanchetta et al. | |
| 6,933,007 B2 | 8/2005 | Fensel et al. | |
| 7,060,658 B2 | 6/2006 | Joedicke | |
| 7,070,843 B2 | 7/2006 | Bartek et al. | |
| 7,132,143 B2 | 11/2006 | Zanchetta et al. | |
| 7,238,408 B2 | 7/2007 | Aschenbeck et al. | |
| 7,291,358 B1 | 11/2007 | Fensel et al. | |
| 7,317,045 B2 | 1/2008 | Zanchetta et al. | |
| 7,442,270 B2 | 10/2008 | Bartek | |
| 7,452,598 B2 | 11/2008 | Shiao et al. | |
| 7,541,059 B2 | 6/2009 | Aschenbeck et al. | |
| 7,604,707 B2 | 10/2009 | Bartek et al. | |
| 7,641,959 B2 | 1/2010 | Joedicke | |
| 2002/0013401 A1 | 1/2002 | Friel et al. | |
| 2002/0050228 A1 * | 5/2002 | Towe | C09B 67/0033 106/422 |
| 2002/0066233 A1 | 6/2002 | McArdle et al. | |
| 2003/0152742 A1 | 8/2003 | Shimizu et al. | |
| 2003/0152747 A1 | 8/2003 | Fensel et al. | |
| 2003/0198736 A1 | 10/2003 | Fensel et al. | |
| 2004/0009319 A1 | 1/2004 | Zanchetta et al. | |
| 2004/0013854 A1 | 1/2004 | Zanchetta et al. | |
| 2004/0071938 A1 | 4/2004 | Fensel et al. | |
| 2004/0109853 A1 | 6/2004 | McDaniel | |
| 2005/0053746 A1 | 3/2005 | Bartek | |
| 2005/0058689 A1 | 3/2005 | McDaniel | |
| 2005/0072110 A1 * | 4/2005 | Shiao | E04D 5/12 52/741.1 |
| 2005/0139126 A1 | 6/2005 | Khan et al. | |
| 2005/0145139 A1 | 7/2005 | Khan et al. | |
| 2005/0238848 A1 | 10/2005 | Fensel et al. | |
| 2005/0250399 A1 | 11/2005 | Kuhn et al. | |
| 2005/0257875 A1 | 11/2005 | Khan et al. | |
| 2005/0261407 A1 | 11/2005 | Khan et al. | |
| 2005/0261409 A1 | 11/2005 | Khan et al. | |
| 2006/0199453 A1 | 9/2006 | Kuhn et al. | |
| 2006/0240224 A1 | 10/2006 | Khan et al. | |
| 2007/0054987 A1 | 3/2007 | Zanchetta | |
| 2007/0095011 A1 | 5/2007 | Khan et al. | |
| 2007/0110961 A1 | 5/2007 | Fensel et al. | |
| 2007/0116987 A1 | 5/2007 | Khan et al. | |
| 2008/0050559 A1 | 2/2008 | Khan et al. | |
| 2008/0241472 A1 | 10/2008 | Shiao et al. | |
| 2009/0064628 A1 | 3/2009 | Mellott et al. | |
| 2009/0312268 A1 * | 12/2009 | McDaniel | 514/17 |
| 2009/0317593 A1 | 12/2009 | Smith et al. | |
| 2009/0326121 A1 * | 12/2009 | Stockl | C08L 93/04 524/287 |
| 2010/0104809 A1 * | 4/2010 | Duda et al. | 428/143 |
| 2010/0151198 A1 | 6/2010 | Khan | |
| 2013/0142952 A1 | 6/2013 | Ruffine et al. | |

OTHER PUBLICATIONS

Murray, Hayden H., "Industrial Applications of Kaolin"; Tenth National Conference on Clays and Clay Materials, pp. 291-298.
"07700 Roofing Specialties and Accessories/Roofing Granules"; National Coatings; Apr. 27, 2006.
Wells, Roy, "Material Safety Data Sheet", Maryland Refractories Co.; Jan. 1, 2007; pp. 1-4.
"Roofing Granules Specifications—#11 Grade"—Corona; Rev. 31A; Feb. 22, 2000.
"3M Cool Roofing Granules"—California Energy Committee PAC Meeting; 03/03/205.
SWT—Product Code GR-2288 Material Safety Data Sheet from The SWT Group, Ontario, Canada, 3 pgs.
Soilworks®, LLC "Soiltac" Material Safety Data Sheet, Chandler, Arizona, 4 pgs.

* cited by examiner

BUILDING CONSTRUCTION MATERIAL WITH HIGH SOLAR REFLECTIVITY

CROSS-REFERENCE TO RELATED APPLICATIONS

The present application claims the benefit of U.S. Provisional Patent Application No. 61/485,977, filed on May 13, 2011 and U.S. Provisional Patent Application No. 61/486,508, filed on May 16, 2011, both of which are incorporated by reference herein in their entirety.

FIELD

The present invention relates to building construction materials for forming an exterior building surface, and more particularly, to roofing, siding and the like, which form a weather barrier allowing the construction of a weather-controlled building envelope and which shields the interior of the building from the intrusion of intemperate air, precipitation and solar radiation.

BACKGROUND

Roofs perform an important function of protecting buildings from weather, such as precipitation and solar radiation. In recent years, the function of roofing as a shield against solar radiation has increased in significance as an area that can be improved to lower energy consumption in maintaining comfortable temperatures in buildings. Many of the attributes of roofing are shared with materials used to construct the sides of a building, e.g., the ability to exclude precipitation and reflect or otherwise diminish unwanted solar radiation. In the following disclosure, roofing material is referred to in several exemplary embodiments of the present disclosure, however, the teachings of the present disclosure could be advantageously employed in forming materials for construction of areas of a building other than the roof, e.g., the sides or siding of the building. One common type of roofing that is popular today is Bituminous (asphalt) roofing, which is aesthetically pleasing, economical and effective, as well as relatively simple to install. Bituminous (asphalt) roofing membranes have been known and used for many years for forming waterproof roofs for buildings, both residential and commercial. Most modern bituminous roofing membranes are formed around a fabric sheet made from polyester, fiberglass or the like. The fabric sheet is coated with bitumen (asphalt), that has been modified with one or more modifiers such as Atactic PolyPropylene (APP), Amorphous Poly Alpha Olefin (APAO), Thermoplastic Polyolefin (TPO), Styrene-Butadiene-Styrene (SBS), Styrene-Ethylene-Butadiene-Styrene (SEBS), or synthetic rubber, to name a few. The modifiers change the properties of the asphalt to increase its utility as a roofing membrane, e.g., to make it more elastic, have greater flexibility at low temperatures and greater heat resistance at high temperatures to prevent softening/flow and deformation from mechanical forces, such as those associated with maintenance personnel walking on the roofing membrane. A roofing membrane may be formed of a laminate of a plurality of types of modified asphalt, e.g., a layer of a first type may be formed on the bottom surface that has an increased adhesive grip on the roofing underlayment and a different layer may be used on the upper surface that has enhanced weather resistance, etc. Adhesive layers may be applied to the membrane to allow the membrane to adhere to a substrate and/or to adhere to an adjacent sheet of roofing membrane. The adhesive may be applied to limited areas, e.g., the edge, where the roofing membrane is intended to overlap. There are a variety of ways for attaching roofing membranes to roofs, such as the application of an adhesive that can be softened by a torch, by "hot mopping" molten asphalt composition to the roof upon which the roofing membrane is applied and adhered, nailing (in the case of shingles) and self-adherent adhesives.

Bituminous roofing frequently employs an upper surface embedded with granules. These granules impart color, texture, foot/shoe slip-resistance and weather resistance to the roofing membrane. The granular texture imparted by the embedded granules has a significant aesthetic/architectural impact on the roofing product. More particularly, the granular texture is typified by having numerous identifiable independent granules, the majority of which extend in three dimensions to optically convey a rough surface to the observer. A granular surface has a multitude of peaks and valleys, shadows and color variations over the surface when illuminated from a given angle and viewed from a given perspective. These features allow the surface roughness to be perceptible to the observer.

The color of a roof has a significant impact on the absorbance/reflection of solar energy and therefore has a significant effect on the amount of energy required to heat/cool a building having that color roof. In hot climates, roofs with greater reflectivity can reduce energy costs related to air conditioning (cooling). In recognition of this effect, government entities have passed laws and regulations pertaining to the color/reflectivity of roofs and established incentives and criteria for selecting roofing materials that result in lowered energy demand. Ratings exist (Energy Star®) to characterize roofing light/heat reflectivity relative to that irradiating a given surface—as a fraction or percentage. For example, the United States Environmental Protection Agency's Energy Star Reflective Roof Program calls for low slope roofs (2:12 or less) to have an initial minimum solar reflectance of 0.65 and an aged three-year reflectance of 0.50. For steep-slope (greater than 2:12) roofs, minimum initial solar reflectance is 0.25, aged three-year reflectance greater than 0.15. As of 2009, ENERGY STAR allows products to qualify for ENERGY STAR certification using the CRRC Color Family Groups in accordance with the CRRC Product Rating Program Manual CRRC-1. Reflectance requirements vary depending upon the standard making body, some requiring greater initial reflectance of low slope roofs, e.g., 0.7O (ASHRAE) or 0.72 (Chicago).

Given a source of reflective granules, it is an objective of roofing manufacturers to achieve maximum coverage of the dark-colored bituminous membrane with the granules and to avoid spaces between the granules through which the dark membrane can be seen and which decreases reflectivity and increases solar radiation absorption. One suggested approach to make a highly reflective roofing and/or siding product employs a supplemental coating of granules of smaller size to fill in the gaps left by larger roofing granules. In theory, the smaller granules help to fill in the dark asphaltic voids between the large granules. A problem raised by this approach is that it is difficult to embed, press in or adhere the smaller granules without further embedding or over-pressing the larger granules that have already been applied to the sheet, i.e., without causing larger asphaltic voids than were present before the second application of granules. This methodology also raises the problem of achieving workable sheet temperature and tension, e.g., around a turnover drum, an S-wrap on a production line or through a press section. If the sheet becomes too cool, the granules will not embed well and will fall off the sheet during production or after exposure to the elements.

The reflectivity of a given granule surface may be increased by applying a reflective coating to the granule surface of a finished roofing membrane, e.g., by applying a paint to the granular surface. This may be conducted after the roof has been installed on a building, or may be applied to the roofing membrane during manufacture in the factory. If applied on-site, painting a roof is a difficult and laborious process due to roof height, slope and weather conditions and the quality of the finished product is dependent upon the skill and reliability of the workman. In either case, known applied coatings typically have a negative impact on the textured appearance of the roofing product. More particularly, to avoid staining or asphalt "strike through," a primer paint may be applied followed by a top color layer. Multiple layers of paint represent added costs and inconvenience and tend to obscure granule texture, diminishing the aesthetic value of the resultant product.

In another approach, granular roofing with small granules is painted during the manufacturing process or in the field to improve reflectivity. This approach virtually eliminates the granule texture and the associated aesthetic attributes, e.g., compared to a membrane with larger roofing granules.

In another approach, granular roofing with large granules is painted. Subsequently, small granules are applied to prevent staining or transfer from the asphalt or modified bitumen membrane. This composite is then painted with a white elastomeric paint to fill the gaps between the granules, causing the granules to be obscured under the white elastomeric coating.

In yet another approach, a modified bitumen roll roofing membrane is coated with a layer of reflective laminate as the membrane is exiting from a formation line. The reflective laminate is heat activated; and then cured. Controlling the sheet temperature, the visco-elastic properties of the laminate, as well as the proper amount of laminate to achieve Energy Star ratings without losing the granule look can be challenging. Therefore, alternative methods, apparatus and formulations for producing reflective, aesthetically pleasing roofing and/or siding material, remain desirable.

In addition to color/reflectivity limitations of crushed stone and other known materials used for making granular surfaces of roofing membranes, the granules also have a limited resistance to erosion when subjected to rainwater, and in particular acidic rainwater, which is common in many areas due to air pollution. Acidic rainwater can etch/dissolve roofing granules, diminishing their reflectivity and loosening their embedment within the asphalt layer, such that they may be displaced from the asphalt layer, e.g., when subjected to mechanical forces, such as wind, leaves, snow, rain and the foot traffic of maintenance personnel. In the latter instance, the loosening of granules can result in diminished traction for maintenance personnel. Accordingly, alternative methods and materials for forming roofing membranes with high reflectivity, durability and weather resistance, remain desirable.

SUMMARY

The present disclosure relates to a coating for application to a surface of a building construction material. The coating is a mixture of water and a finely divided material having a particle size of less than about 0.004" and a reflectivity of over about 70% dispersed therein, the mixture having a viscosity of about 1-6,000 cP at 25 degrees C. and an applied dry thickness of about 0.2 mils to about 2.4 mils.

In accordance with another aspect of the present disclosure, the building construction material is granulated roofing having a plurality of granules disposed over a surface thereof with a portion of the surface uncovered by granules and wherein the coating after application to the granulated roofing preserves the granular appearance of the granulated roofing and at least partially covers a portion of the granulated roofing surface that is not covered by the granules.

In accordance with another aspect of the present disclosure, the finely divided material is Calcium Carbonate, which is present in a ratio of about 5% to about 50% with the remainder being water.

In accordance with another aspect of the present disclosure, the coating includes a binder included in the mixture.

In accordance with another aspect of the present disclosure, the binder is an acrylic.

In accordance with another aspect of the present disclosure, the binder is a modified acrylic.

In accordance with another aspect of the present disclosure, the binder is a vinyl copolymer.

In accordance with another aspect of the present disclosure, the vinyl copolymer includes at least one of polyvinyl acetate and polyvinyl alcohol.

In accordance with another aspect of the present disclosure, the following components are present in the following weight percentages: Calcium Carbonate about 5% to 50%; vinyl copolymer about 0.5% to about 20%; Water about 45% to about 94%, yielding a mixture with a viscosity of about 80 to about 6000 Cps.

In accordance with another aspect of the present disclosure, the following components are present in the following weight percentages: Calcium Carbonate about 5% to 50%; vinyl copolymer about 0.5% to about 20%; Water about 45% to about 94% and further including a water repellant about 0.5% to about 20%, yielding a mixture with a viscosity of about 80 to about 6000 Cps.

In accordance with another aspect of the present disclosure, the viscosity is in the range of about 8.0 to about 6000 cP at a dry thickness of about 0.2 to about 2.4 mils.

In accordance with another aspect of the present disclosure, the finely divided material includes at least one of Titanium Dioxide, ceramic nano-particles, Talc, Dolomite; Pumice, Diatomaceous Earth, ceramic microspheres, Copper nano-particles, Silver nano-particles and Zinc Oxide.

In accordance with another aspect of the present disclosure, the following components are present in the following weight percentages: Water 10 to 40%; Thickener: 0% to about 2%; Dispersant 1% to about 5%; surfactants 0% to about 2%; Defoamer 0% to about 2%; white pigment 5% to about 30%; light stabilizers 0.1% to about 4.0%; Ceramic microspheres 0.1% to about 8%; Mineral filler about 1% to about 15%; Acrylic Resin about 20% to about 50%; Coalescing solvents about 1% to about 10%; Ammonia about 0% to about 2%.

In accordance with another aspect of the present disclosure, the is a water-based binder, the binder having a viscosity of about 500-6,000 cP and an applied dry thickness of about 0.5 mils to about 2.4 mils.

In accordance with another aspect of the present disclosure, the binder is a modified acrylic.

In accordance with another aspect of the present disclosure, the coating further includes microspheres.

In accordance with another aspect of the present disclosure, the microspheres are present in an approximate amount of about 0.1% to about 20% by weight relative to the binder.

In accordance with another aspect of the present disclosure, a method for increasing the reflectivity of a surface of a construction material includes: (A) applying a finely divided material having a reflectivity greater than 70% to the surface of the construction material; (B) over-spraying the surface with the finely divided material thereon with a binder coating, wetting the powdered material; (C) allowing the binder coating to dry such that dry coating bonds the finely divided material together and bonds the finely divided material to the surface of the construction material.

In accordance with another aspect of the present disclosure, the construction material is a modified bituminous roofing membrane and further comprising the step of heating the roofing membrane prior to the step of applying.

In accordance with another aspect of the present disclosure, the roofing membrane has a plurality of granules pressed into the surface during a pressing step occurring prior to the step of applying, the step of reheating occurring after the step of pressing and before the step of applying and wherein the step of applying includes applying the finely divided material to the surface at least partially to areas not covered by the plurality of granules.

In accordance with another aspect of the present disclosure, the finely divided material includes Calcium Carbonate and the binder coating includes at least one of a modified acrylic and a vinyl copolymer.

In accordance with another aspect of the present disclosure, the finely divided material includes at least one of the following Titanium Dioxide, ceramic nano-particles, Talc, Dolomite; Pumice, Diatomaceous Earth, ceramic microspheres, Copper nano-particles, Silver nano-particles and Zinc Oxide.

In accordance with another aspect of the present disclosure, a granular roofing material having the coating of as mentioned above has at least a portion of the granules having a core having an outer surface and a core coating disposed over the outer surface, the core coating being applied as a liquid and drying to a solid layer covering at least 80% of the outer surface of the core and having an associated color and a reflectivity greater than that of the core prior to coating with the coating, the core and the core coating forming a coated granule, at least some of the granules having a hydrophobic coating, the hydrophobic coating having the following constituents in the following weight percentage ranges: water/naptha 50-90, steric acid 8-35, and parapol 2-10, the hydrophobic coating being heat curable and substantially clear when cured.

In accordance with another aspect of the present disclosure, the composition of the core coating comprises in the following weight percentage ranges: water 5-40, ethylene/propylene glycol 0.1-2.0, latex polymer 7-40, hydroxyethyl cellulose 0.1-2.0, sodium polyacrylate 0.1-2.0, potassium tripolyphosphate 0.1-2.0, titanium dioxide 2-15, zinc oxide 1-9, aluminum trihydrate 5-30, calcium carbonate 3.5-12 microns 2-15, hydrated aluminum-magnesium silicate 0.1-5, bicyclic oxazolidines 0.1-2.0, silicone-free mineral oil 0.1-2.0, latex polymer 7-40, alcohol alkoxylates 0.1-2.0, aqua ammonia 0.1-2.0, ester alcohol 0.1-2.0, 2-N-Octyl-4-isothiazolin-3-one 0.1-2.0, and butyl benzolphalate 0.1-2.0.

BRIEF DESCRIPTION OF THE DRAWINGS

For a more complete understanding of the present invention, reference is made to the following detailed description of exemplary embodiments considered in conjunction with the accompanying drawings.

DETAILED DESCRIPTION OF EXEMPLARY EMBODIMENTS

Figure 1:
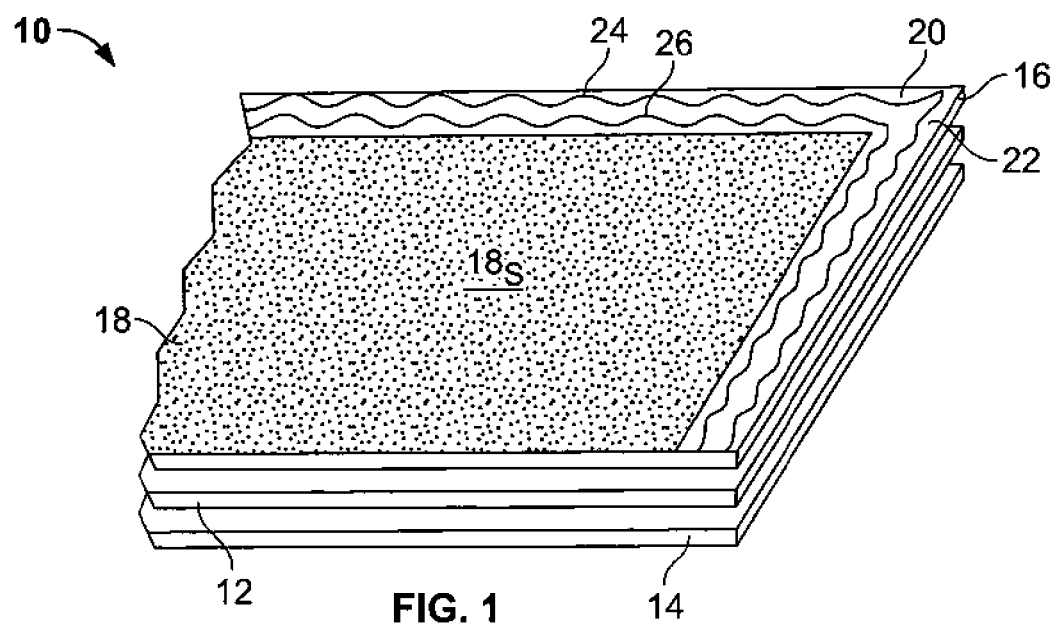
FIG. 1 is a perspective, partially exploded view of a modified bituminous, laminated roofing membrane in accordance with an exemplary embodiment of the present disclosure.

FIG. 1 shows a roofing membrane 10 in accordance with an embodiment of the present disclosure. The roofing membrane 10 has an inner sheet or mat 12 composed of polyester or fiberglass or other similar material from which a fabric may be made. Bottom and top layers 14, 16, respectively, of asphalt compound are laminated to opposing sides of the fabric mat 12. (For ease of visualization, the layers 12, 14, 16 are shown spaced apart.) The top layer 16 has a plurality of granules 18 disposed over the upper surface thereof forming a granular surface $18_S$. Optionally, peripheral edges 20, 22 may be left smooth (without granules) to form a substrate for beads of adhesive 24, 26. As noted above, while the membrane 10 is described as a roofing membrane, it could also be used for other applications, such as siding.

Figure 2:
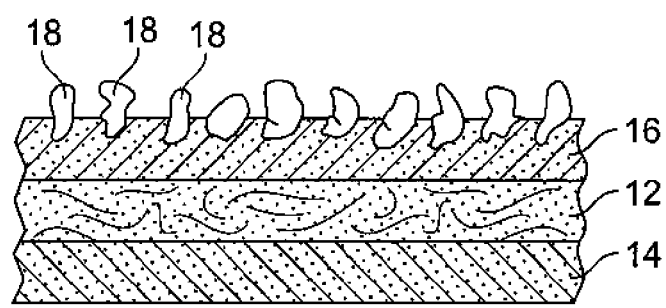
FIG. 2 is an enlarged cross-sectional view of the roofing membrane of FIG. 1.

FIG. 2 shows an enlarged cross-section of the roofing membrane 10, with the layers 12, 14 and 16 laminated together. The granules 18 can be seen to be embedded in the upper layer 16 of modified asphalt compound.

Figure 3:
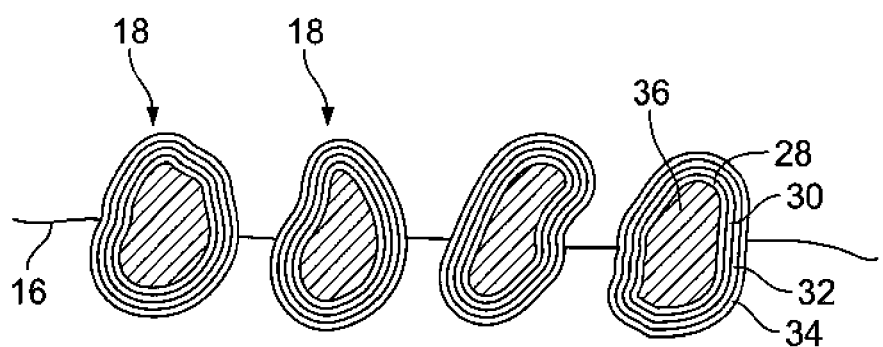
FIG. 3 is an enlarged cross-sectional view of granules used in the roofing membrane of FIGS. 1 and 2 in accordance with another exemplary embodiment of the present disclosure.

FIG. 3 shows the granules 18 in cross-section and having a plurality of intermediate layers 28, 30, 32 of coloring composition and an outer hydrophobic layer 34 disposed over a granule core 36. The intermediate color composition layers 28, 30, 32 and outer hydrophobic layer 34 depicted are exaggerated in size relative to the granule core 36 for ease of illustration. In fact, color composition layers 28, 30, 32 are each approximately 1-2 mils thick. The hydrophobic layer 34 is also about 1-2 mils thick. The composition, preparation and properties of these granules is described below and in U.S. patent application Ser. No. 12/334,091 entitled ROOFING MATERIAL, filed Dec. 12, 2008, published as US 2010/0151198, which application is incorporated by reference in its entirety herein. In FIG. 3, the granules themselves are independently coated. As shown in FIG. 3, there is no coating layer that bridges between granules 18 and the top asphalt layer 16. As a result, breakage of these absent, fragile and relatively brittle bridge portions of a coating layer is avoided, even if the roofing membrane is bent, e.g., when rolled for storage and shipment. The independently coated granules 18 of the present invention are thus free to move independently as constrained only by the top asphalt layer 16 and by the abutment of adjacent granules 18. It should be appreciated that FIG. 3 is diagrammatic as regards to showing a significant spacing between granules 18 (for ease of illustration). In actual roofing membrane 10, the spacing between granules 18 would be minimal and there would be overlap between granules 18 forming the granular surface 18$_S$, such that the underlying asphalt layer 16 would be largely obscured from view.

The outermost hydrophobic layer 34 of the granules 18 aids in shedding water, in particular rainwater, which may be acidic. Besides aiding in one of the basic purposes of roofing membranes 10 (shedding water), the hydrophobic layer 34 also protects the granules 18 from dissolution by rainwater (in particular, acidic rainwater) thereby preserving the color/reflectivity and the dimensions/surface smoothness of the granules 18. In one embodiment, the hydrophobic layer 34 is clear, such that the coloring composition layers 28, 30, 32 are visible through the hydrophobic layer 34. While the hydrophobic layer 34 is diagrammatically depicted as an outer "shell", it is understood that at the atomic/molecular level, the composition forming the hydrophobic layer 34 may penetrate into the layers 28, 30, 32 of color composition and bond therewith. While the granules 18 are one example of granules that may be employed with other aspects of the present disclosure described below, the present disclosure is not intended to be limited to the use of this type of granule 18. Other types of granules, such as, crushed rock, e.g., feldspar, granite, quartzite, slate, basalt, marble, crushed porcelain and other ceramics, alumina, and other granules known in the roofing and siding manufacturing business, e.g., ISP 707 ultra bright white granules from Specialty Granules, Inc. Hagerstown, Md. or White Armor® WA-10 or WA-14 from National Coatings Corporation of Camarillo, Calif. or 3M Cool Roof Granules, 3M Corporation, St. Paul, Minn. to name a few, could be utilized.

Figure 4:
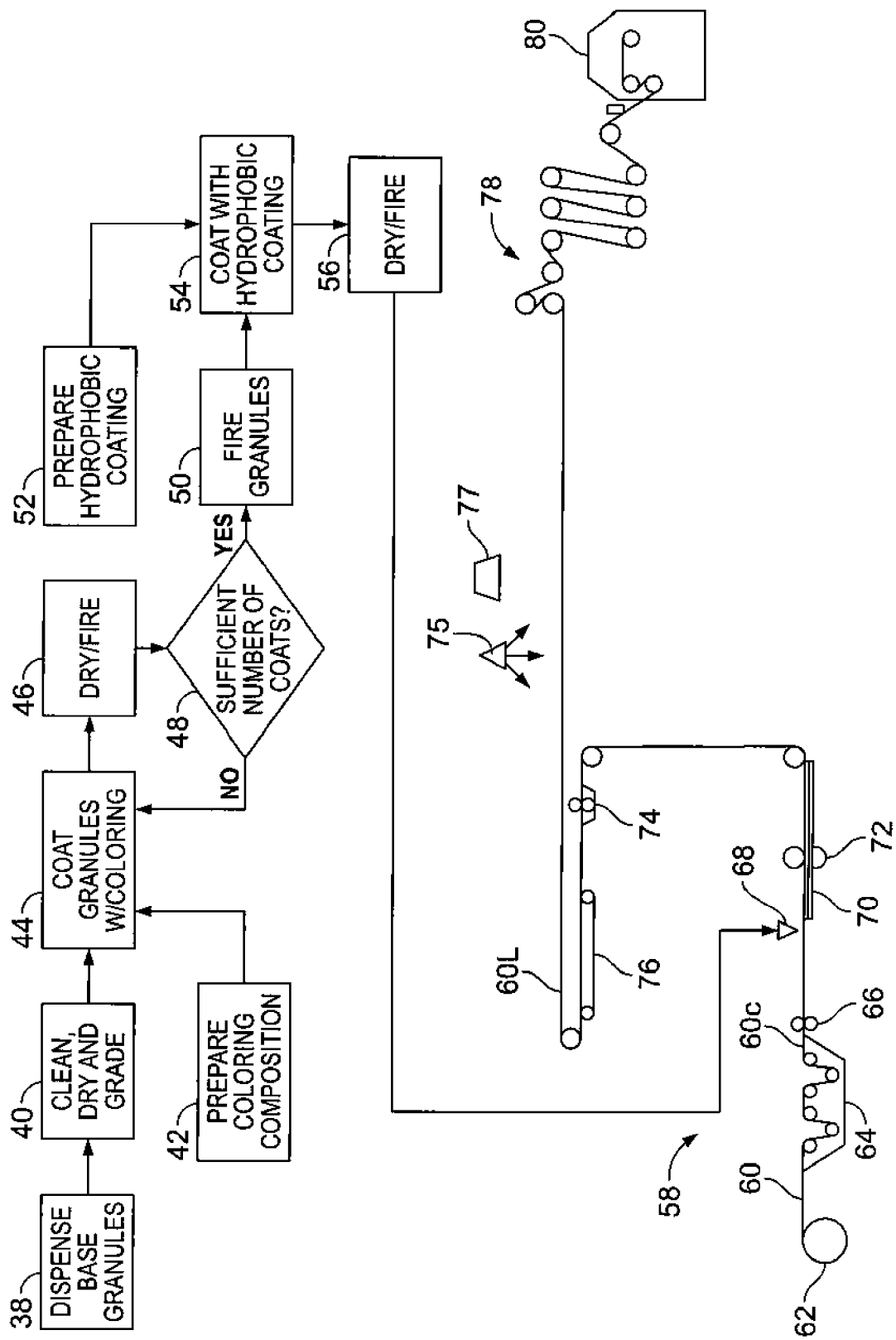
FIG. 4 is a diagram of a process in accordance with an exemplary embodiment of the present disclosure for making a roofing membrane.

FIG. 4 shows a diagram of an exemplary process for forming a roofing membrane 10 in accordance with the present disclosure. Base granules (for forming the granular core 36 of granules 18), such as crushed rock, typically feldspar, granite, quartzite, slate, basalt, or other types of rock, are mined and processed off site and may be obtained commercially from various quarries and suppliers of crushed stone, worldwide. The base granules (granular cores 36) are dispensed 38 into the production line, e.g., onto a conveyer belt or into buckets. The granular cores 36 are then optionally cleaned, dried and graded 40, e.g., by screening to eliminate granules that are too small or too large (which either pass or do not pass through appropriately sized screens.) and then sprayed with water and/or subjected to air flows to remove small particles of dust and dirt. These processes may be conducted by the supplier of the granules or may be done in-house. A liquid coloring composition to be applied to the granules is prepared 42. The final color of the granules 18 is determined by the color of the coloring composition (that forms layers 28, 30, 32), rather than the color of the granular core 36, leading to greater freedom in choosing the type of rock used in forming the granular core 36, based on its natural coloring.

An exemplary coloring composition contains the following constituents in the relative weight percentages shown in Table 1:

| Typical White Coating formulation | | | |
|---|---|---|---|
| Raw Material | Actual WT % | Range WT % | Description |
| Water | 14.09 | 5-40 | Vehicle for thickener |
| Ethylene/Propylene Glycol | 0.615 | 0.1-2.0 | anti freeze |
| Foam Master | 0.187 | 0.1-2.0 | defoamer |
| Latex Polymer | 23.55 | 7-40 | resin |

| -continued | | | |
|---|---|---|---|
| Typical White Coating formulation | | | |
| Raw Material | Actual WT % | Range WT % | Description |
| Natrosol | 0.525 | 0.1-2.0 | thickener |
| Tamol 850 | 0.42 | 0.1-2.0 | dispersing agent |
| KTPP | 0.15 | 0.1-2.0 | dispersing agent |
| Titanium dioxide | 9 | 2-15 | pigment |
| Zinc Oxide | 4.5 | 1-9 | anti fungi agent |
| Aluminum Trihydrate | 9.75 | 5-30 | fire retardent |
| Calcium Carbonate 3.5-12 microns | 9 | 2-15 | filler |
| Attagel/Minugel | 0.54 | 0.1-5 | thickener |
| Nuosept 95 | 0.135 | 0.1-2.0 | preservative |
| Foam Master VF | 0.188 | 0.1-2.0 | defoamer |
| Latex Polymer | 23.55 | 7-40 | resin |
| Triton | 0.195 | 0.1-2.0 | dispersing agent |
| Aqua Ammonia | 0.105 | 0.1-2.0 | PH modifier |
| Texanol | 0.735 | 0.1-2.0 | cosolvent |
| Skane microbiocode | 0.135 | 0.1-2.0 | biocide |
| Sanicizer | 0.78 | 0.1-2.0 | plastisizer |

Attagel™ is a trademark of BASF Corporation and Minugel™ is a trademark of Active Minerals International, LLC. Both Attagel™ and Minugel™ are known to be synonymous with hydrated aluminum-magnesium silicate. Nuosept 95™ is a trademark of ISP, Inc., which is synonymous with bicyclic oxazolidines and contains poly(oxymethylene), alpha-[1H,3H,5H-oxazolo[3,4-c]oxazol-7a(7H)-ylmethyl]-omega-hydroxy-556709-13-8 and formaldyhyde. Foam Master VF™ is a trademark of Cognis Co. and is synonymous with silicone-free mineral oil. Triton™ is a trademark of Dow Chemical Co. and is synonymous with alcohol alkoxylates. Texanol™ is a trademark of Eastman Chemical Co. and is synonymous with ester alcohol, a non-VOC solvent. Skane™ is a trademark of Dow Chemical Co. and is synonymous with 2-N-Octyl-4-isothiazolin-3-one. Santicizer™ is a trademark of Monsanto Chemical Co. and is synonymous with butyl benzolphalate/phthalate plasticizer. Parapol™ is a trademark of Exxon Corporation and is synonymous with polybutene.

The coloring composition is prepared in accordance with the following exemplary method as shown in Table 2 below. With Mixer Off Meter in:

Water
TURN MIXER ON AT LOWEST SPEED AND ADD:
Ethylene/Propylene Glycol
ADD AND MIX AT LOWEST SPEED:
Foam Master VF
TURN OFF MIXER AND ADD BY OUTAGE:
Latex EC-1791
*ADD IN ORDER* TURN ON MIXER INCREASE SPEED AS NEEDED TO MAINTAIN A VORTEX:
SLOWLY ADD INTO VORTEX AND MIX 5 MINUTES UNTIL LUMP FREE:
Natrosol 250 HR/ER52000
ADD INTO VORTEX:
Tamol 681
ADD INTO VORTEX:
Tamol 850
ADD INTO VORTEX:
KTPP
**INCREASE MIXER SPEED AND HEIGHT AS NEEDED TO MAINTAIN VORTEX:
ADD INTO VORTEX:
TI02/CR828/R706/2310
ADD INTO VORTEX:
Zinc Oxide/XX503/Azo 66L -continued

```
ADD INTO VORTEX:
Aluminum Trihydrate/C330/DH80/SB432
ADD INTO VORTEX:
Calcium Carbonate 3.5-12 microns
ADD SLOWLY INTO VORTEX:
Attagel 50/Minugel 400
ADD INTO VORTEX:
Nuosept 95
RINSE MIXER WITH HOSE:
Water
****MIX AT HIGH SPEED FOR 10 MINUTES* MAKE
SURE TEMPERATURE IS BELOW 120 F.
*CHECK GRIND MUST BE 3 MILS OR LESS*
*LET DOWN PHASE*
ADD INTO VORTEX:
Foam Master VF
TURN OFF MIXER AND ADD BY OUTAGE:
Latex EC-1791
***TURN ON MIXER AND REDUCE SPEED TO
REDUCE AIR ENTRAINMENT:
ADD INTO VORTEX:
Triton X-405
ADD SLOWLY INTO VORTEX:
Aqua Ammonia 26%
ADD SLOWLY INTO VORTEX:
Texanol/NX795
ADD SLOWLY INTO VORTEX:
Skane M8 microbiocide
ADD INTO VORTEX:
Sanicizer 160
```

MIX 5 MINUTES AND HAVE LAB TEST VISCOSITY AND PH
*COVER BATCH WITH 1 GALLON OF WATER USING SPRAY HOSE
*FILTER BATCH DURING PACKAGING*

Test

```
SOLIDS WT %
DENSITY LBS/GAL
BROOKFIELD VISCOSITY 4D/5 rpm/77 F.
BROOKFIELD KU 77 F.
WET COLOR- DRAW DOWN
PH
```

Variations in the foregoing granule coloring composition and method for preparing same may be made, e.g., while the foregoing composition yields a white color, other colors may be obtained by substituting titanium dioxide with another pigment.

Given a supply of appropriately sized, cleaned and dry granular cores 36, they are coated 44 with the above-described liquid coloring composition. Coating 44 may preferably be accomplished by dipping the granular cores 36 in the coloring composition, e.g., by passing a perforated conveyor belt or basket supporting the granular cores 36 through a bath of coloring composition. Alternatively, the coating maybe sprayed onto the granular cores 36. The coated granular cores 36 (hereinafter "coated granules") are then air dried 46. Drying may be accelerated by heating, e.g., by using a rotary kiln or passing the coated granules on a conveyor belt through an oven/kiln. The coated granules may be agitated to promote separation of the individual granules (prevent clumping) during drying. In a preferred embodiment of the present invention, the coated granules are fired at a high temperature, e.g., 1300.degree.-1500.degree. Fahrenheit for a significant period of time, e.g., 2 to 24 hours. This assures that the color coating is cured and all solvent has been evaporated. The exemplary liquid coloring composition described above is water-based and therefore no apparatus need be provided to capture evaporated solvent. The granules may be agitated periodically during firing to prevent clumping and/or mechanically separated after firing to promote individuation of the granules. Depending upon the initial color of the granule and the desired end color, multiple coating 44 and drying/firing 46 steps may be performed. For example, given feldspar granules having a reflectivity of 0.28 on the ASTM C1549 solar reflectance scale using a SSR device, three coatings of coloring composition as described above, with a viscosity of 1000-20000 CPS will yield a bright white granule having a reflectivity of 0.74-0.86 or higher, depending on the number of coats, are suitable for producing roofing membrane having an Energy Star® rating of 0.65 to 0.74. Accordingly, at step 48, it is determined if a sufficient number of coats of the coloring composition have been applied. If not, the coated granules are recoated 44 and dried/fired 46 until a sufficient number of coats have been applied. (Multiple coats also ensure that the granule is coated over substantially the entire outer surface with coloring composition, e.g., to compensate for any bare spots that might result from incompletely coating the granules or due to de-clumping before or during firing. Acceptable granules should be at least 75% covered over the entirety of their outer surface and preferably 80% to 100% covered to insure high reflectivity. The coated granules are then fired 50 in an oven/kiln at a high temperature for a prolonged period of time, e.g., 1300.degree.-1500.degree. Fahrenheit for 2 to 24 hours.)

A hydrophobic coating (to be applied, if desired, as hydrophobic layer 34) is prepared 52, having the following composition:

TABLE 4

| Water Seal Coating | Actual | Range | Description |
|---|---|---|---|
| Water/Medium Aliphatic oil | 70% | 50-90% | Solution vehicle |
| Steric Acid | 25% | 8-35% | protectant for weathering |
| Parapol | 5% | 2-10% | water repellant |

The hydrophobic coating is prepared by adding and mixing the foregoing in the above-listed order.

The color coated and fired granules are then coated 54 by spraying or dipping with the hydrophobic coating and dried/fired 56. As before, the firing may be conducted at high temperatures, e.g., 1300°-1500° Fahrenheit for 2 to 24 hours. This process may be repeated to apply additional coats of hydrophobic coating 34, if desired. The finished granules 18 display a minimum hardness of 5.0 on Moh's mineral scale, are non-toxic, hydrophobic, bright white in color and have a reflectivity: 0.74 or 74%. Higher reflectivity can be achieved by adding more coats to achieve a granule with a reflectivity of 84-86%. As noted above, the granules are preferably graded/sized prior to coating and may be re-graded after coating. For roofing granules, a suitable granule size is 12-30 mesh. The granules 18 resulting from the foregoing process are then supplied to the processing line 58 and used to prepare roofing membrane 10.

A fabric mat 60 is supplied to the processing line 58 from a mat unwinding station 62. The mat 60 is saturated with modified asphalt in saturation tank 64, forming a composite mat 60c. The thickness of the composite mat 60c may be controlled by calendar rolls 66, which also impart smooth, flat upper and lower surfaces to the composite mat 60c. The composite mat 60c may be subjected to various processing steps, such as scraping selected areas for the application of adhesive, the application of release strips to the adhesive, etc., based upon the finished product desired. Coated granules 18 may be supplied to and dispensed by a surfacing applicator 68 onto the hot composite mat 60c, which is then cooled by a chilled water bath 70 to about 95° Celsius. The granules 18 carried on the upper surface of the composite mat 60c are then pressed into the surface thereof by press rollers 72, such that the granules 18 are embedded in the modified asphalt, which mechanically grips the granules 18, when fully cooled. The hydrophobic layer 34 on the granule 18 is compatible with the modified asphalt of layer 16 in that both are co-valent in nature, such that the asphalt adheres to the surface of the coated granules 18. Illustrating one possible roofing membrane embodiment, the bottom side of the composite mat 60c can be coated with a self-adhesive layer in coating vat 74, forming a three part laminate mat 60L, which is then cooled on a cooling belt 76.

As described further below, the membrane 60L may be partially or completely coated by one or more sprayers 75 (or alternative coating apparatus) ejecting a composition described below, which after drying/curing imparts an increased reflectivity to the membrane 60L, inter alia, by covering the asphaltic voids between granules 18 with a reflective coating. An air knife 182 (See FIG. 5) or other coating thickness controller may be used to control the thickness of the coating. A drying station 77 utilizing heat, air and/or vacuum may be provided after the sprayer(s) 75 to accelerate drying/curing.

The membrane 60L then passes through an accumulator 78 and then to a winder 80, where it is cut and wound into rolls of finished roofing membrane. Release films may be inserted to prevent self-adhesive layers from bonding to opposing surfaces of the roofing membrane when rolled into a roll. Alternatively, the roofing membrane 10 may be provided with a sand backing to prevent transfer of asphalt from the rear surface of the roofing membrane 10 to the upper granulated surface $18_S$.

The foregoing roofing membrane 10 is flexible due to the fact that the granules 18 are each embedded (to about 50% of their extent) in the modified asphalt, but are not joined to adjacent granules 18 by a thick, rigid over-coating which bridges there between, as would be present with a painted-over granulated upper surface $18_S$. The independently coated granules 18 have a stable color coating (28, 30, 32) which is not prone to cracking or degradation from bending of the roofing material, e.g., when it is rolled into rolls or bent during installation. Even if reflective coating applied by the sprayer(s) 75 cracks off granules 18, the granule 18 beneath is still reflective. The upper surface of the roofing membrane is reflective, having an Energy Star® rating of 0.65 to 0.74, due to the coated granules 18. The applied coating 179 (See FIG. 5) can raise these reflectivity ratings. High levels of reflectivity also protects the roofing membrane 10 from sun damage by keeping the roofing membrane cooler, thereby avoiding degradation of the modified asphalt and softening/flow thereof. By preventing softening, the undesirable release of granules 18 from their embedded position in the asphalt 16 is also prevented, increasing the useful life of the roofing membrane 10 and preserving a reliable footing surface for workers who walk on the roof, particularly in sloped roof applications.

The hydrophobicity of the hydrophobic layer 34 on the granules 18 making up the granular surface $18_S$ of the roof membrane 10 aids in shedding water from the roof surface to prevent water infiltration and to reduce the amount of time the roof remains wet, thereby minimizing the growth of moss, algae and other unwanted plant growth. In addition, the shedding of rainwater also reduces the exposure time of the roofing membrane 10, in particular the granules 18, from the corrosive effects of acidic rainwater, which could otherwise attack the core 36 of the granule 18, with negative implications on reflectivity and useful life of the roofing membrane. More particularly, etching of the granule 18 would alter the size/color and/or smoothness of the granules 18, leading to diminished reflectivity and granule retention. In the case of a granule having a colored coating composition, a hydrophobic coating can also shield the color composition layer(s) 28, 30, 32 from the effects of acidic rainwater.

Figure 5:
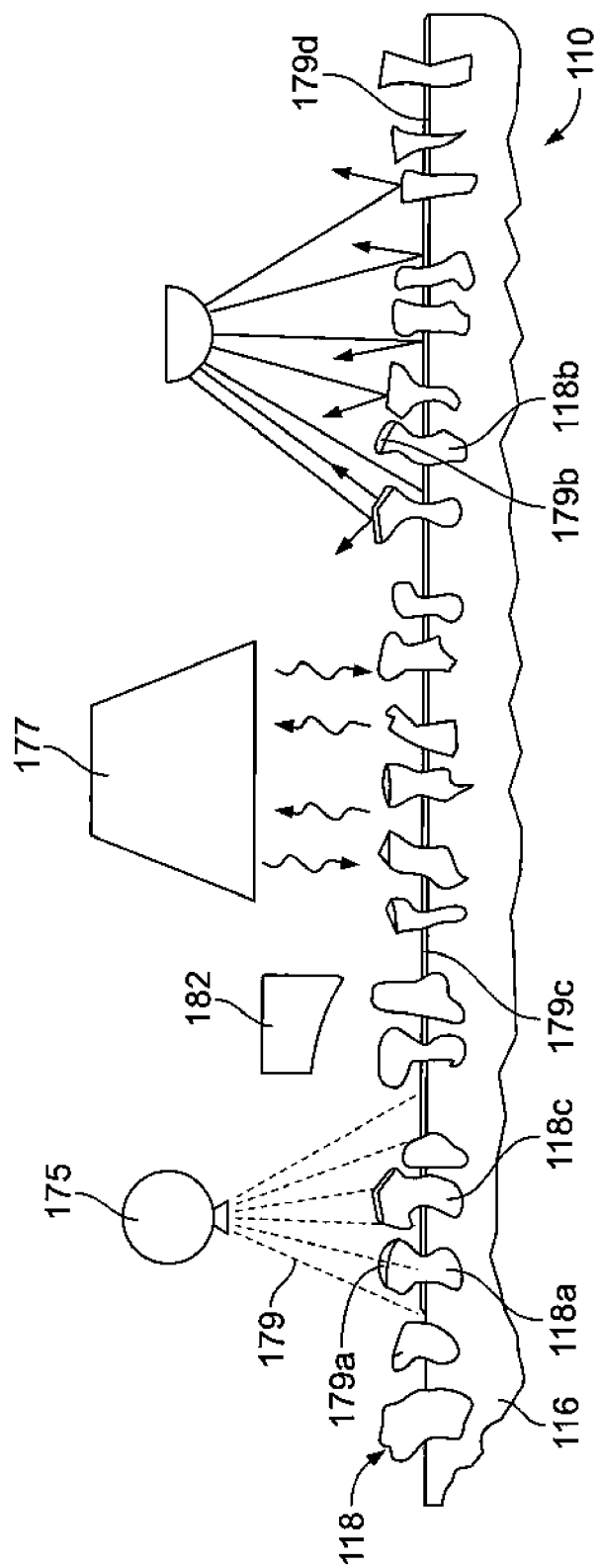
FIG. 5 is a schematic depiction of a method for making a roofing membrane in accordance with yet another embodiment of the present disclosure.

FIG. 5 illustrates another aspect of the present disclosure, an apparatus and method for increasing the reflectivity of a granulated roofing/siding material 110 having granules 118 embedded in a top layer 116, e.g., made with or containing asphaltic/modified bituminous compounds. Alternatively, the roofing/siding material 110 may contain or be formed from other materials, such as, PVC, EPDM, TPO, PP, PE, LDPE, neoprene, Hypolon, PDVF, tire rubber, SBES or synthetic asphalt, to name a few. The granules 118 may be made as described above relative to granules 18, or may be any other type of available granule, e.g., granules that may be purchased commercially, such as the ISP 707, the White Armor WA-10 or 3M Cool Roof granules mentioned above. The roofing/siding material 110 may be produced in accordance with the above-described process, or by any other process. Given a roofing/siding material 110 of this type, e.g., in the form of an elongated sheet (or in the form of round shingles, poured-in-place roofing, built-up roofing (BUR), square shingles or other types of roofing), like membrane 60L of FIG. 4, a reflective coating 179 may be prepared and applied to increase the reflectivity of the material 110. The coating 179 may be prepared by dispersing calcium carbonate, limestone, talc, dolomite, $TiO_2$ or similar, low cost, light-colored minerals or pigments, in water, with or without a binder. The resultant coating 179 can be applied by one of more spray heads 175 as a light spray onto the roofing and/or siding material 110. Alternatively, the coating can be applied by fog heads, curtain coating, extruding, roller coating, kiss-coating, or other methods of applying a thin, light coating. The applied coating 179 coats the granules 118 and may partially or completely fill in the voids between the granules 118 where the top layer 116 would otherwise be exposed to solar radiation. In the case of a dark-colored top layer 116, partial or complete coverage of the voids between granules 118 by a lighter colored coating 179 results in an increased reflectivity of the roofing/siding material 110. The granules 118 may be either hydrophillic or hydrophobic. If the granule 118 is hydrophilic, as illustrated by granule 118a, the water-based coating 179 wets the granule with a thin layer 179a of the coating 179, which may be partially or completely retained thereon. An air knife 182, squeegee, brush, rubber roller or similar device, may be used to remove excess coating 179 or aid in spreading the coating 179 across the roofing/siding material 110. After dying, which may be accelerated by heat, air or vacuum applied by dryer 177, the granule 118b retains a thin, dry layer of reflective coating 179b. If the granule 118 is hydrophobic, as illustrated by granule 118c, it is probable that a lesser amount of the water-based coating 179 will remain on the granule 118c and more will run off onto the surface of layer 116 between the granules 118. After drying, which may be accelerated by heat, air or vacuum applied by dryer 177, the granule 118 retains its original reflectivity and/or the reflectivity is enhanced by the reflectivity imparted by the coating 179, as illustrated by granule 118b. No matter whether the granules 118 are hydrophilic or hydrophobic, a sufficient quantity and density of coating 179 is sprayed on or otherwise deposited on the material 110 to partially or completely wet the surface of the layer 116, forming a thin, wet layer of coating 179c on the voids between the granules 118, which dries to a dry reflective layer 179d. Regardless whether the dry reflective layer 179d completely or partially covers the voids between the granules 118, any area that is covered that was previously uncovered, represents an improvement in coverage of the voids that would not be present without the coating 179d, i.e., if the coating 179d is lighter in color/higher in reflectivity than the top layer 116, whatever its composition.

The coating 179 in liquid form is preferably low viscosity, e.g., in the range of 1-10,000 cP, more preferably 1-1,500 cP and more preferably 8-500 cP for an aqueous Calcium Carbonate $CaCO_3$ coating 179 composition described below and more preferably 50-6,000 cP for an acrylic coating 179 composition described below, and is applied in a suitably thin coat, e.g., 2-80 μm dry film thickness or more preferably, 5-60 μm dry film thickness for an acrylic coating. Applied at these viscosities and thicknesses, the coating 179 will provide improved reflectivity, but will not obscure the granularity of standard roofing granules or highly reflective roofing granules, such that the definition of the particles, the contrast between dark and light areas of the roofing/siding surface, e.g., due to shadows cast by the granules is preserved, and the desired, aesthetically pleasing, rough texture of the resulting roofing/siding material 110 is retained.

A hydrophobic particle 18 and a method and formulation for making the particle 18 is described above. In accordance with an alternative embodiment of the present disclosure, a hydrophilic particle may be utilized for roofing granules. Most rocks are hydrophilic and may be coated to make them hydrophobic or to make them adhere better to asphalt (with "anti-stripping" agents typically made from an amine (which is polar and hydrophilic) and hydrocarbons, like asphalt (which is hydrophobic). More particularly, a naturally hydrophilic particle such as quartz, silica, pumice, sandstone, dolomite, basalt, scoria, which may also be porous, is embedded in a membrane, e.g., like membrane 60 of FIG. 4 described above. As part of the coating composition, a hydrophobic agent, such as, Parapol may be added to the coating 179 composition in liquid form, such that when the coating 179 is applied, it is absorbed onto/into the granules 18. When the coated membrane 60 is dried, the dried coating on/in the granules 18 exhibits hydrophobic characteristics.

In yet another aspect of the present disclosure, a clear, water-based modified acrylic coating may be applied as a thin layer to an existing roofing membrane to increase the reflectivity thereof.

In accordance with another alternative embodiment of the present disclosure, a water-based, modified acrylic coating, e.g., the coating commercially sold as SWT-2288, available from SWT Group, 1591 Kildare Rd., Windsor, ON N8W 2W2, may optionally be further modified by adding reflective and/or wear resistant additives for application to granular roofing membranes to enhance the performance and extend the life of the roof at very low thickness (25-35 μm). More particularly, minerals, such as Calcium Carbonate $CaCO_3$ (limestone), Titanium Dioxide $TiO_2$, talc, dolomite, pumice, diatomaceous earth, which act as pigments, and wear resistant components (which also may have a pigment function), such as, ceramic nanoparticles, ceramic, glass or ceramic microspheres, copper, silver, zinc oxide or ceramic nanoparticles, to name a few, may be added to the modified acrylic. In order to preserve the desired aesthetics of the of granular coated surface, a viscosity in the range of about 500-6000 cP, at time of application, would be beneficial. The coating thickness (wet) is preferably in the range of about 25-60 μm or about 1.0-2.2 mils, which yields a dry coating having a thickness of about 12-40 μm or about 0.5-1.6 mils.

In accordance with another aspect of the present disclosure, a binder may be used in conjunction with the water to form a liquid phase into which a mineral component, such as Calcium Carbonate may be dispersed. The binder may be a water-based acrylic, a modified acrylic or a vinyl copolymer like Polyvinyl Acetate or Polyvinyl Alcohol.

As yet another alternative, a membrane, like membrane 60 of FIG. 4 may be reheated after dropping and pressing granules 18, 118 on/into the surface of upper layer 16, 116 thereof to soften the layer 16, 116, e.g., a bituminuous/asphaltic layer. While the upper surface is softened, a pigment powder, such as Titanium Dioxide $TiO_2$ or Calcium Carbonate $CaCO_3$ is dusted/sprayed onto the surface of the granulated roofing/siding material 10, 110. The powder will stick to the softened layer 16, 116. A layer of powder may be built up, which is thicker than that which is adhered to the softened layer 16, 116, e.g., to a thickness of about 0.46 mm or 18 mils. The powder coated material 10, 110 may then be coated by a binder, such as Soiltac® vinyl copolymer available from Soilworks®, LLC, 2450 S. Gilbert Rd., Step 210, Chandler, Ariz. 85286-1595 or SWT-2288 clear acrylic coating available from SWT Group, 1591 Kildare Rd., Windsor, ON N8W 2W2, which may be sprayed on and wets the powder layer. The binder binds the powder together, the powder remaining visible through the clear coating, and resulting in a coating 179b, 179d as shown in FIG. 5. Upon drying, the resultant layer of powder/binder is retained on the granular surface of the material 10, 110. The binder sprayed on the granular surface 18, 118 of the material 10, 110 may be sprayed or otherwise applied in a manner which washes the powder coating off the upper surfaces of the granules 18, 118 and down onto the layer 16, 116 (the voids between the granules 18, 118). Alternatively, if the spray is fine and applied gently enough, the powder applied to the granules may not be displaced and will be retained on the granules after wetting and drying.

EXAMPLE 1

It has been found in one non-limiting example, that mixing $CaCO_3$ in the range of about 5% to 50% by weight with water in the range of about 50% to about 95% will yield a coating composition 179 with a viscosity of about 1.0-6,000. cP at 25 degrees Celsius and may be sprayed on a granular surface to a thickness (when dry) of about 5 μm to about 60 μm (0.2-2.4 mils). The wet thickness will be appreciably greater than the dry thickness, e.g., twice as thick. In one specific example, about 21% calcium carbonate $CaCO_3$ from Blue Mountain Minerals, Columbia, Calif. (with an initial non-diluted reflectivity of 72%) was stirred with 79% water (by weight) to yield a mixture (slurry). The mixture was sprayed onto a granular roofing and/or siding material having an initial reflectivity of about 66.8%. After drying, the coated roofing material displayed an increased reflectivity of about 69.7%, an increase of about 4.4%. This improvement in reflectivity upgrades a roofing/siding product that just meets Energy Star 65% reflectivity and boosts it to a level of acceptance just below the American Society of Heating, Refrigerating and Air-Conditioning Engineers (ASHRAE) 90.1, Energy Standard for Buildings Except Low-Rise Residential Buildings, section 5.5.3.1.1 standard defines a cool roof as having a minimum solar reflectance of 70%.

In an experiment, various ratios of Marble White Calcium Carbonate powder from Specialty Minerals, Inc. New York, N.Y. (with an initial non-diluted reflectivity of 88%) were mixed with water to ascertain good sprayability to reflectivity in a resultant sprayed, granulated roofing surface, while still preserving the granularity of the samples. Based upon these tests, it was determined that 1000 g of Marble White Calcium Carbonate powder mixed with 1 gallon of water (a ratio of 1 part Marble White Powder to 3.785 parts water) provided good sprayability to reflectivity, while preserving granular appearance. Five 9"×12" samples of roofing were sprayed with the resulting liquid by one pass through an 8" spray pattern at about 40 PSI. The samples were tested for reflectivity prior to testing and were retested after the coating was applied and allowed to dry. For comparison, an existing roof coating, PolyBright 70 (initial non-diluted reflectivity of 81%), available from Polyglass, Inc. of Fernley, Nev. was thinned with water to varying degrees with the same objectives of sprayability and resultant reflectivity in mind. This process indicated that a thinning with water at a 1/1 ratio or 50/50 volume ratio yield a thin sprayable liquid with good reflectance in the resultant coating without excessively obscuring granule shape. The thinned mixture was applied to five additional samples of roofing under the same conditions as the spraying of the Calcium Carbonate mixture was conducted.

A comparison of the measured reflectance for the samples appears in the tables below:

| POLYBRIGHT 50/50 | | | | | |
|---|---|---|---|---|---|
| | SAMPLE #1 | | SAMPLE #2 | | SAMPLE #3 |
| | BEFORE | AFTER | BEFORE | AFTER | BEFORE | AFTER |
| | 0.675 | 0.684 | 0.664 | 0.695 | 0.650 | 0.694 |
| | 0.667 | 0.674 | 0.663 | 0.676 | 0.663 | 0.689 |
| | 0.678 | 0.693 | 0.678 | 0.685 | 0.652 | 0.682 |
| | 0.665 | 0.686 | 0.663 | 0.687 | 0.675 | 0.687 |
| | 0.689 | 0.690 | 0.674 | 0.696 | 0.687 | 0.709 |
| Average | 0.6748 | 0.6854 | 0.6684 | 0.6878 | 0.6654 | 0.6922 |

| | SAMPLE #4 | | SAMPLE #5 | |
|---|---|---|---|---|
| | BEFORE | AFTER | BEFORE | AFTER |
| | 0.671 | 0.671 | 0.666 | 0.665 |
| | 0.696 | 0.690 | 0.675 | 0.667 |
| | 0.672 | 0.686 | 0.665 | 0.679 |
| | 0.672 | 0.686 | 0.668 | 0.696 |
| | 0.687 | 0.700 | 0.680 | 0.695 |
| Average | 0.6796 | 0.6866 | 0.6708 | 0.6804 |

| LIMESTONE 1000 g | | | | | |
|---|---|---|---|---|---|
| | SAMPLE #1 | | SAMPLE #2 | | SAMPLE #3 |
| | BEFORE | AFTER | BEFORE | AFTER | BEFORE | AFTER |
| | 0.640 | 0.707 | 0.672 | 0.727 | 0.654 | 0.702 |
| | 0.663 | 0.708 | 0.659 | 0.706 | 0.677 | 0.703 |
| | 0.669 | 0.711 | 0.661 | 0.695 | 0.675 | 0.691 |
| | 0.665 | 0.698 | 0.663 | 0.731 | 0.686 | 0.722 |
| | 0.667 | 0.749 | 0.664 | 0.747 | 0.685 | 0.768 |
| Average | 0.6608 | 0.7146 | 0.6638 | 0.7212 | 0.6754 | 0.7172 |

| | SAMPLE #4 | | SAMPLE #5 | |
|---|---|---|---|---|
| | BEFORE | AFTER | BEFORE | AFTER |
| | 0.672 | 0.720 | 0.691 | 0.712 |
| | 0.655 | 0.704 | 0.649 | 0.717 |
| | 0.692 | 0.722 | 0.676 | 0.705 |

| LIMESTONE 1000 g | | | |
|---|---|---|---|
| | 0.668 | 0.733 | 0.676 | 0.732 |
| | 0.683 | 0.776 | 0.676 | 0.777 |
| Average | 0.6740 | 0.7310 | 0.6736 | 0.7286 |

The foregoing test results indicate that the PolyBright 70 improved the reflectance values and the Marble White spray produced a surprising increase in reflectance, i.e., an on average 5.30% increase. Given the goal of meeting reflectance standards of 70% to qualify under California's Title 24 and the American Society of Heating, Refrigerating and Air-Conditioning Engineers (ASHRAE) 90.1, Energy Standard for Buildings Except Low-Rise Residential Buildings, section 5.5.3.1.1 standard defines a cool roof as having a minimum solar reflectance of 70%, the Marble White results are highly significant, in that they consistently result in raising the reflectance value of a roofing sample which previously did not exhibit 70% reflectance to one that exceeds that level.

EXAMPLE 2

In another non-limiting example, a mixture of about 5 to 50% by weight of finely ground limestone, about 0.5% to about 20% of vinyl copolymer binder and 5% to about 94.5% water may be used as a coating 179 for roofing and/or siding material. The coating has a viscosity of about 80 to 6,000 Cps at 25 degrees Celsius and may be sprayed on a granular surface to a dry thickness of about 5 µm to about 60 µm or 0.6-2.4 mils. In one specific example, 20% Specialty Minerals Inc, New York, N.Y. Marble White 200 limestone ground to a fineness that passes through a US or Tyler mesh #200 having screen openings of 0.0029 inches or 0.075 mm., 3.9% of Soilworks Soiltac, a vinyl copolymer binder from Soilworks®, LLC, 2450 S. Gilbert Rd., Ste 210, Chandler, Ariz. 85286-1595, and 76.1% water was made into a slurry with low shear mixing and sprayed onto the surface of a roofing and/or siding material having an initial reflectivity of about 67.6%. After drying, the reflectivity was increased by the coating by 10.3% to 74.6%, taking a product that meets Energy Star 65% reflectivity and boosting it to a level of acceptance above the American Society of Heating, Refrigerating and Air-Conditioning Engineers (ASHRAE) 90.1, Energy Standard for Buildings Except Low-Rise Residential Buildings, section 5.5.3.1.1, a standard which defines a cool roof as having a minimum solar reflectance of 70%. The resultant product exhibited high solar reflectivity without significantly sacrificing granule definition and while retaining the aesthetic effect of granulated roofing/siding. The addition of a vinyl copolymer binder to the slurry allowed for a higher amount of calcium carbonate to be deposited onto the granules, more than doubling the reflectivity of Example #1 above, and generating reflectivity increases from about 4.4% to about 10.3% using very simple application equipment. A tank, a stirrer, a pump and spray nozzles may be used to apply the coating to a roofing/siding material surface. Depending upon the composition of the coating, a surfactant may be added to aid in obtaining and maintaining a dispersion of the mineral component/components, e.g., $CaCO_3$ in the aqueous base. Alternatively, a stirrer may be used to maintain a dispersion.

EXAMPLE 3

In another non-limiting example, a mineral, such as $CaCO_3$ (limestone), $TiO_2$, Talc, Dolomite, pumice, diatomaceous earth, ceramic nanoparticles, ceramic microspheres, glass microspheres, copper, silver, or zinc oxide nanoparticles in a weight percentage of about 0.1% to about 20% is added to 80% to about 99.9% by weight of a water-based modified acrylic with a viscosity of about 50-6,000 cP and may be sprayed on a granular surface to a wet thickness of about 15-130 μm to yield a dry coating thickness of about 5-60 μm or 0.2-2.4 mils. The resultant coating is then applied to granular roofing/siding material by spraying, or other alternative methods. After drying, the coated roofing/siding material exhibits enhanced reflectivity and other enhancements in the attributes of granule adhesion, initially and after heating/aging, impact resistance, scrubbing and power-washing resistance.

In accordance with another aspect of the present disclosure, the binder used in conjunction with the water may be a vinyl copolymer like Polyvinyl Acetate or Polyvinyl Alcohol to form the liquid phase into which the mineral component, e.g., Calcium Carbonate, is dispersed.

EXAMPLE 4

In one specific example, a clear, water-based, modified acrylic coating available from SWT Group, 1591 Kildare Rd., Windsor, ON N8W 2W2, viz., SWT-2288 (Product Code GR-2288 specific gravity: 1.180 g/ml; flash point (TCC): >100 C; Evaporation rate; slower than n-Bu-Ac; Percent solids by weight: 45%; percent volatile 55%; VOC 40 g/L; pH @77 F: 8.1; Freezing point: 32 F; Hazardous ingredients: ethylene glycol monobutyl ether 1-5%) was coated on a granular roofing substrate and were then dried at 50° C. for 20 minutes to obtain a dried finished thickness (DFT) of about 1.0 mil and then tested. The test parameters and results appear below:

Testing Parameters:
Coating Identification(s): SWT 2288 Clear
Substrate Identification(s): Polyglass supplied ceramic granular roofing membrane
Test to be performed: 1) Initial Adhesion
  2) Boiling Water Immersion+Adhesion
  3) Oven Aging+Adhesion
  4) Impact Resistance
  5) Scrub Test
  6) Powerwasher Test
Procedures:
  Each test was performed on a coated and undercoated panel for comparative purposes
  All coated panels were sprayed with SWT-2288 at 1.0 mils DFT
  Coated panels were dried at 50° C. for 20 minutes. NOTE: This was done to expedite the drying process and is not necessary to achieve full cure of the coating.
Initial Adhesion
  a. A strip of 3M 898 adhesion tape was placed on each of the panels and was pressed into the substrate using a thumb.
  b. The strip of tape was then removed quickly by hand in a single motion and inspected for removal of granules.
  Results: The uncoated panel had some removal on the tape, approximately 10%, while the panel coated with SWT-2288 had no removal.
Boiling Water Immersion+Adhesion
  a. Both panels were immersed in boiling water for 20 minutes and then removed.
  b. A strip of 3M 898 adhesion tape was placed on each of the panels and was pressed into the substrate using a thumb.
  c. The strip of tape was then removed quickly by hand in a single motion and inspected for removal of granules.
  Results: The uncoated panel had some removal on the tape, approximately 10%, while the panel coated with SWT-2288 had no removal. There was no noticeable difference between the panel that had been immersed in boiling water and those that hadn't been immersed with respect to adhesion of the granules.
Oven Aging+Adhesion
  a. Both panels were placed in an oven for 36 hours at 80° C. and the removed.
  b. A strip of 3M 898 adhesion tape was placed on each of the panels and was pressed into the substrate using a thumb.
  c. The strip of tape was then removed by hand and inspected for removal of granules.
  Results: The panel that was uncoated has significantly more removal after oven aging than the panel that was not exposed to oven aging. The panel coated with SWT-2288 had no removal after the adhesion test.
Impact Resistance
  a. The panels were placed on an impact tester and were subjected to 80 pounds of impact.
  b. The panel was inspected for damage.
  Results: The panel that was uncoated resulted in a very damaged, separated granule structure while the coated panel appeared to hold the integrity of the granules together in a more cohesive manner.
Scrub Test
  a. The panels were weighed prior to any testing.
  b. The panels were then "scrubbed" by hand in a back and forth motion 50 times with a brush.
  c. The sections were then inspected for removal and discoloration and were weighed to determine the loss of granules.
  Results: The panel that was uncoated became very dirty and stained significantly after the scrub test had been completed. There was a loss of 2% of the total weight of the panel. The SWT-2288 coated panel had no staining and no loss of granules for a total weight loss of 0%.
Powerwasher Test
  a. The panels were then subjected to a pressurized stream of water, held 5 inches from the panel for 10 seconds.
  b. The panels were inspected for removal of granules.
Results: There was a significant loss of granules on the uncoated panel compared to the coated panel As can be appreciated, the clear acrylic coating improved the roofing material as regards, granule adhesion, integrity and resistance to heat, abrasion and water flow.

In addition to the foregoing tests, oven aging testing of a roofing membrane covered with ISP standard 720 white granules with a coating of SWT 2228 of about 2 mils dry finished thickness was also conducted as described in the table below.

| Whiteness Test Oven Aged @ 70 C. (158 F.) ||
| --- | --- |
| Name | L Value |
| Competitor A-As manufactured | 93.5 |
| Competitor A-Aged 30 days | 85.2 |
| Delta | 8.3 |
| Competitor B-As manufactured | 86.4 |
| Competitor B-Aged 30 days | 75.8 |
| Delta | 10.6 |

-continued

Whiteness Test
Oven Aged @ 70 C. (158 F.)

| Name | L Value |
|---|---|
| Competitor C-As manufactured | 90.6 |
| Competitor C-Aged 30 days | 85.5 |
| Delta | 5.1 |
| Invention-as made* | 93.9 |
| Invention-Aged 90 days | 91.1 |
| Delta | 2.8 |

*2 mils of SWT 2228 coating over ISP standard 720 white granules

In addition, reflectivity tests were conducted as described in the following table:
Reflectivity Results

| | No thin film coating | 0.9-1.2 mils SWT 2228 standard thin film coating | 0.9-1.2 mils SWT 2228 High Gloss thin film coating | 1.8-2.2 mils SWT 2228 standard thin film coating | 1.8-2.2 mils SWT 2228 High Gloss thin film coating |
|---|---|---|---|---|---|
| Membrane made with ISP 720 white granules | 27% | 44% | 67% | 68% | 74% |
| Membrane made with ISP 707 Bright white granules | 39% | 57% | 63% | 70% | 74% |
| Smooth membrane, no granules | 7% | 55% | 75% | 74% | 81% |

In accordance with an aspect of the present disclosure, about 0.8 to about 1.2 mils of SWT 2228 thin coating was applied to a roofing membrane with highly reflective granules from National Coatings (WA-10, WA-14) with an initial 70-80% reflectivity achieve a final reflectivity equal to or greater than 70%. About 1.8 to 2.2 mils of SWT 2228 thin film coating applied to a roofing membrane with granules with an initial reflectivity of 27% or 39% to achieve a final coated product with 70% reflectivity. Typically, the wet thickness of the coating is about twice the thickness of the dry coating.

EXAMPLE 5

In accordance with an embodiment of the present disclosure, 0.3% by weight of ceramic microspheres obtained from 3M, Zeeospheres Ceramic, LLC or HY-TECH under the trademarks: 3M, Zeeospheres or ThemacCels, respectively, were added and mixed into a volume of SWT 2288. The resultant mixture was applied to granular roofing material having an initial reflectivity of 65.6%. After drying/curing the roofing material exhibited a reflectance measurement of 75.5%, a 15.2% improvement in reflectivity. The improvements in granule adhesion, integrity and resistance to heat, abrasion and water observed in Example 4 for the clear SWT 2288, were similarly observed to be present in the roofing material coated with the acrylic coating having the added ceramic microspheres, but accompanied by improved reflectivity and wear resistance imparted by the ceramic microspheres, which performed pigmentation and wear-resistance functions.

The modified acrylic white reflective coating with ceramic microspheres was applied at a wet thickness of about 50-80 µm to yield a dry thickness of about 25-30 µm and was observed to have an initial reflectivity of 75.6. The sample was aged in an oven at 120° C. (248° F.) for about 20 hours to simulate 3 year's outdoor exposure and the reflectivity of the aged sample was measured to be about 62.4%, representing a loss of about 17% reflectivity. By comparison, a roofing material sample which was the same except for the modified acrylic coating with ceramic microspheres, and having an initial reflectivity of 65.6%, was oven aged to the same extent (3 year's aging equivalent) and exhibited a resultant reflectivity of 49.7%—a loss of over 24%.

In order to preserve the desired aesthetics of the of granular surface coated, a viscosity in the range of about 500-6000 cP of the above-described modified acrylic coating with ceramic microspheres would be beneficial. The coating thickness is preferably in the range of about 25-60 µm or 1.0-2.4 mil dry coating.

EXAMPLE 6

In another non-limiting example, a mixture of from about 5% to about 50% of finely ground limestone, about 0.5% to about 20% of vinyl copolymer binder, about 45% to 94% water, and about 0.5% to 20% water repellant, e.g., Parapol from Exxon, Corp. was made into a slurry with low shear mixing. The slurry had a viscosity of about 80 to 6000 Cps at 25 degrees Celsius and may be sprayed on a granular surface to a dry thickness of about 5 µm to about 60 µm (0.2-2.4 mils). The resultant coating may be sprayed onto the surface of a granulated roofing/siding material to increase the reflectivity thereof.

EXAMPLE 7

In a more specific example, 20% Specialty Minerals Inc, New York, N.Y. Marble White 200 limestone ground to a fineness of 200 US mesh, was mixed with 4% vinyl copolymer binder, viz., Soiltac®, available from Soilworks®, LLC, 2450 S. Gilbert Rd., Ste 210, Chandler, Ariz. 85286-1595, 71% water, and 5% Parapol (hydrophobic component) to make a slurry via low shear mixing. The resultant mixture was sprayed onto the surface of a roofing and/or siding material having an initial reflectivity of about 67.64%. The dried coating increased the reflectivity by 10.3% to 74.62% without significantly sacrificing granule definition and retaining the aesthetic effect of the uncoated granule roofing/siding material. The addition of a vinyl copolymer binder in the slurry allowed for a higher amount of calcium carbonate to be deposited onto the granules while more than doubling the reflectivity of Example #1 improving the reflectivity from 4.4% to 10.3% with very simple equipment, viz., a tank, a stirrer, a pump and spray nozzles. The previously hydrophilic roofing granules showed a marked hydrophobicity, in part, observable due to higher reflectivity attributable to more of the coating depositing in the gaps between the granules 118 (rather than being retained on the granules 118, which were at the start highly reflective).

EXAMPLE 8

As another non-limiting example, a modified bituminous roofing membrane, like membrane 60 of FIG. 4, was reheated after dropping and pressing granules 18, 118 on/into the upper surface thereof to soften the upper surface of the bituminuous/asphaltic layer 16, 116. While the upper surface was softened, dry, powdered, $CaCO_3$ was dusted/sprayed onto the surface of the granulated roofing material. A portion of the powdered $CaCO_3$ stuck to the softened bituminuous/asphaltic layer and the layer of powder was applied at a thickness of 0.45 mm or 18 mils. The powdered membrane was then sprayed with SWT-2288 (clear) modified acrylic coating available from SWT Group of Ontario, Canada, which wet the powder layer and bound the powder together upon drying. The white $CaCO_3$, remained visible through the clear coating. Upon drying, the resultant layer of powder/binder was retained on the granular surface of the membrane. As noted above, other types of binders could be used for this purpose, such as Soiltac® vinyl copolymer. Further, the binder sprayed on the granular surface of the membrane may be sprayed in a manner which washes the powder coating off the upper surfaces of the granules and down onto the asphaltic voids between the granules or a gentle application method may be used that does not displace the powder applied to the granules. The latter procedure would be advisable if the granules used were not highly reflective and high reflectivity was sought in the final product.

EXAMPLE 9

In accordance with another aspect of the present disclosure, a coating was prepared having the following formula.
SWT Coating Formula

| Ingredient | Weight % |
| --- | --- |
| Water | 10-40% |
| Thickener | 0-2% |
| Dispersant | 1-5% |
| Surfactants | 0-2% |
| Defoamer | 0-2% |
| White Pigment | 5-30% |
| Light Stabilizers | 0.1-4.0% |
| Ceramic microspheres | 0.1-8% |
| Mineral Filler | 1-15% |
| Acrylic Resin | 20-50% |
| Coalescing Solvents | 1-10% |
| Ammonia | 0-2% |

The following are non-restrictive examples of specific ingredients that may be used in the foregoing formulation:
Thickener: Hydroxyethylcelulose;
Surfactant: Polyacrylic acid or similar type;
Defoamer:paraffinic, mineral or silicone oil;
White pigment: $TiO_2$;
Light stabilizer: liquid hindered amine, as one example;
Mineral filler: $CaCO_3$ (limestone), Talc, Dolomite, pumice, diatomaceous earth, ceramic nano-particles, ceramic microspheres, glass microspheres, copper, silver or zinc oxide nano-particles;

Acrylic Resin High Tg Butyl Acrylate or Methyl Methacrylate type
Coalescing Solvent: 2,2,4-trimethyl-1,3-pentanediol mono(2-methylpropanoate) or similar type.

In the preceding, non-limiting example, the ingredients are mixed to yield a liquid with a viscosity of about 1,000 to 6,000 cP at 25 degrees Celsius and may be sprayed on a surface of roofing material, such as granular roofing/siding material, to obtain a dry finished thickness of about 0.5 to about 2.4 mils. The coated roofing/siding material exhibits enhanced reflectivity and other enhancements in the attributes of impact resistance, scrubbing, power-washing resistance and granule adhesion, initially and after heating/aging.

In accordance with another aspect of the present disclosure, the binder used in conjunction with the water may be an acrylic, modified acrylic, a vinyl copolymer like Polyvinyl Acetate or Polyvinyl Alcohol or other binders to form the liquid phase into which the mineral/pigment component, e.g., Calcium Carbonate, is dispersed.

It should be appreciated that the present disclosure provides a roofing material having high reflectivity and that the reflective material applied in the voids between granules is either thin enough and/or flexible enough to be retained on the roofing material during normal handling and wear conditions for the periods prescribed by various standards making bodies to provide the required reflectivity.

The above-described reflective and hydrophobic granules 18 and/or any of the above-described reflective coatings 179 can be used in combination with a variety of roofing membranes and systems. For example, on the surface of the roofing membranes described in U.S. Pat. No. 6,924,015 to Zanchetta et al., entitled, Modified Bitumen Roofing Membrane With Enhanced Sealability and/or U.S. Published Patent Application No. US 2007/0054987 to Zanchetta et al., entitled Polyethylene Modified Asphalt Compositions, each of which are incorporated herein by reference in their entirety. The granules 18 and/or coatings of the present disclosure can be utilized in conjunction with standard commercial modified asphalt roofing materials, such as APP, SBS hot-mopped, torch or self-adhered roofing membrane, roll roofing and flashing for new roofing, re-roofing, re-covering and BUR (built up roofing) repair applications (as a cap sheet). Roofing membranes 10 in accordance with the present invention may be used on flat roofs (with pedestrian access, or limited access, profiled metal decks, industrial saw-tooth roofs and curved roofs. It should be appreciated that the coating compositions disclosed may be used with any roof/siding material, including those which use granules other than those described herein. While the present disclosure has referred to granulated roofing, the coating methods, materials and apparatus may be used on roofing membranes without granules, e.g., roofing membranes with a smooth surface.

While the present invention has been described in reference to specific embodiments thereof, those with normal skill in the art may see the possibility of making variations on these embodiments without departing from the scope of the present invention. It is intended that all such variations fall within the scope of the appended claims. For example, the coating may include additional ingredients known in the art, such as, anti-fungal, fire retardant, and/or anti-foaming agents, preservatives, pH modifiers and/or biocides. All such variations and modifications are intended to be included within the scope of the appended claims.

We claim:

1. A building construction material, comprising:
an asphaltic roofing membrane;
a single layer of standard large size roofing granules applied to an upper surface of the roofing membrane;
a liquid coating applied to the upper surface of the roofing membrane, the liquid coating consisting essentially of:
a mixture of water and a finely divided material having a particle size of less than about 0.004" and a reflectivity of over about 70% dispersed therein and a binder, wherein the finely divided material is present in an amount of about 5% to about 50% by weight, the binder 0.5% to about 20% by weight, with the remainder being water present in an amount from 50% to about 94.5% by weight, the mixture having a viscosity of about 50-6,000 cP at 25 degrees C., the liquid coating applied to the roofing membrane at a temperature at which the roofing membrane is tacky, the liquid coating drying to an applied dry thickness of about 0.2 mils to about 2.4 mils adhered to the upper surface, the upper surface hardening upon cooling, retaining the dry coating thereon, wherein the roofing membrane has a portion of the upper surface thereof between the granules that is uncovered by granules, wherein the coating at least partially covers the portion of the upper surface between the granules while preserving the granular appearance of the upper surface, the building construction material having a reflectivity ≥70%.

2. The building construction material of claim 1, wherein the finely divided material is calcium carbonate.

3. The building construction material of claim 2, wherein the calcium carbonate is present in an amount of 21-50 wt %.

4. The building construction material of claim 1, wherein the liquid coating is a slurry.

5. The building construction material claim 1, wherein the binder is an acrylic.

6. The building construction material, of claim 1, wherein the binder is a modified acrylic.

7. The building construction material of claim 1, wherein the binder is a vinyl copolymer.

8. The building construction material of claim 7, wherein the vinyl copolymer includes at least one of polyvinyl acetate and polyvinyl alcohol.

9. The building construction material of claim 7, wherein the mixture has a viscosity of about 80 to about 6000 Cps.

10. The building construction material of claim 1, wherein the finely divided material includes at least one of the following titanium dioxide, ceramic nano-particles, talc, dolomite, pumice, diatomaceous earth, ceramic microspheres, copper nano-particles, silver nano-particles and zinc oxide.

11. The building construction material of claim 1, wherein the following components are optionally present in the following weight percentages: thickener: 0% to about 2%; dispersant 1% to about 5%; surfactants 0% to about 2%; defoamer 0% to about 2%; light stabilizers 0.1% to about 4.0%; ammonia about 0% to about 2%.

12. The building construction material of claim 1, wherein at least a portion of the granules have a core having an outer surface and a core coating disposed over the outer surface, the core coating being applied as a liquid and drying to a solid layer covering at least 80% of the outer surface of the core and having an associated color and a reflectivity greater than that of the core prior to coating with the coating, the core and the core coating forming a coated granule, at least some of the granules having a hydrophobic coating, the hydrophobic coating having the following constituents in the following weight percentage ranges: water/naptha 50-90, steric acid 8-35, and parapol 2-10, the hydrophobic coating being heat curable and substantially clear when cured.

13. The building construction material of claim 12, wherein the composition of the core coating comprises in the following weight percentage ranges: water 5 -40, ethylene/propylene glycol 0.1-2.0, latex polymer 7-40, hydroxyethyl cellulose 0.1-2.0, sodium polyacrylate 0.1-2.0, potassium tripolyphosphate 0.1-2.0, titanium dioxide 2-15, zinc oxide 1-9, aluminum trihydrate 5-30, calcium carbonate 3.5-12 microns 2-15, hydrated aluminum-magnesium silicate 0.1-5, bicyclic oxazolidines 0.1-2.0, silicone-free mineral oil 0.1-2.0 alcohol alkoxylates 0.1-2.0, aqua ammonia 0.1-2.0, ester alcohol 0.1-2.0, 2-N-Octyl-4-isothiazolin-3-one 0.1-2.0, and butyl benzolphalate 0.1-2.0.

14. The building construction material of claim 1, wherein the water in the coating has evaporated leaving the finely divided material on the upper surface of the roofing membrane in a dry thickness in the range of 0.2-2.4 mil.

15. The building construction material of claim 14, wherein the upper surface of the roofing membrane with the finely divided material has a reflectivity greater than 70%.

16. A building construction material, comprising:
an asphaltic roofing membrane;
a single layer of standard large size roofing granules applied to an upper surface of the roofing membrane;
a first coating applied to the upper surface of the roofing membrane at a temperature at which the upper surface is tacky, the first coating comprising:
a layer of finely divided material having a particle size less than about 0.004" and a reflectivity of over about 70% disposed on the upper surface, on and between the granules the layer of finely divided material adhering to the tacky upper surface; and
a second coating, comprising a binder layer disposed over the layer of finely divided material and the granules, the binder layer having a viscosity of about 1-6,000 cP when applied and an applied dry thickness of about 0.2 mils to about 2.4 mils, the first coating and the second coating adhering to the upper surface preserving a texture of the building construction material imparted by the granules, the finely divided material and the binder layer at least partially covering a portion of the upper surface that is not covered by the granules.

17. The building construction material of claim 16, wherein the binder is an acrylic.

18. The building construction material of claim 16, wherein the binder is a modified acrylic.

19. The building construction material of claim 16, wherein the binder is a vinyl copolymer.

20. The building construction material of claim 16, wherein the binder further includes microspheres.

21. The building construction material of claim 20, wherein the microspheres are present in an approximate amount of about 0.1% to about 20% by weight relative to the binder.

22. The building construction material of claim 16, wherein the finely divided material includes at least one of the following: calcium carbonate, titanium dioxide, ceramic nano-particles, talc, dolomite, pumice, diatomaceous earth, ceramic microspheres, copper nano-particles, silver nano-particles and zinc oxide.

23. A building construction material, comprising: a granulated modified bituminous roofing membrane having a plurality of granules pressed into an upper surface thereof in a single layer, with a portion of the upper surface uncovered by granules, the granules having dimensions of standard large sized roofing granules; a coating applied to the upper surface at a temperature rendering the upper surface tacky, consisting essentially of a slurry of water and calcium carbonate having a particle size of less than about 0.004" and a reflectivity of over about 70% present in an amount of about 5% to about 50% by weight with the remainder being water present in an amount from 50% to 95% by weight, the coating having a viscosity of about 1-1500 cP at 25 degrees C. and forming an applied dry thickness of about 0.2 mils to about 2.4 mils adhered to the upper surface, the upper surface hardening upon cooling, retaining the dry coating thereon, and wherein the coating preserves the granular appearance of the building construction material and at least partially covers a portion of the upper surface that is not covered by the granules, the building construction material having a reflectivity≥70%.

24. The building construction material of claim 23, wherein the granules have dimensions approximating those of at least one of WA10, WA14, ISP720, ISP 707 roofing granules.

25. The building construction material of claim 24, wherein the coating applied to the building construction material is a single thickness from a single application of the coating.

26. The building construction material of claim 23, wherein the calcium carbonate is present in an amount between 27% to 50%.

27. The building construction material of claim 23, wherein the water in the coating has evaporated leaving the calcium carbonate on the upper surface in a dry thickness in the range of 0.2-2.4 mil.

\* \* \* \* \*